G. W. CROWE.
Carriage-Brake.
No. 57,625. Patented Aug. 28, 1866.
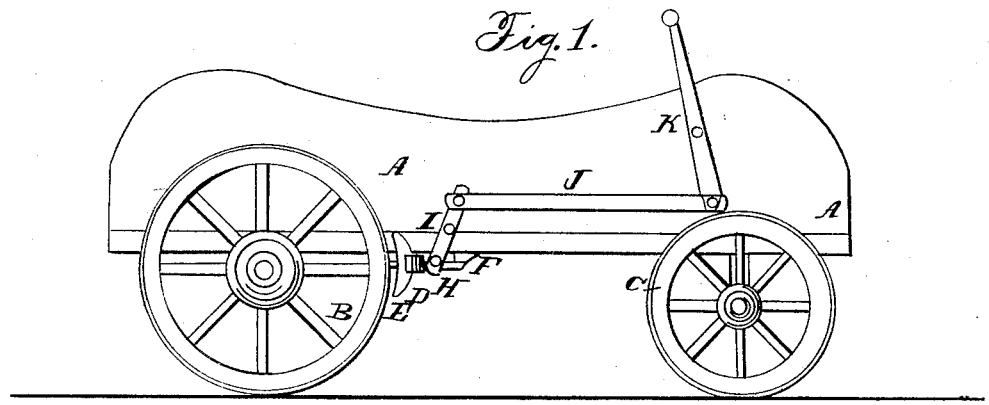
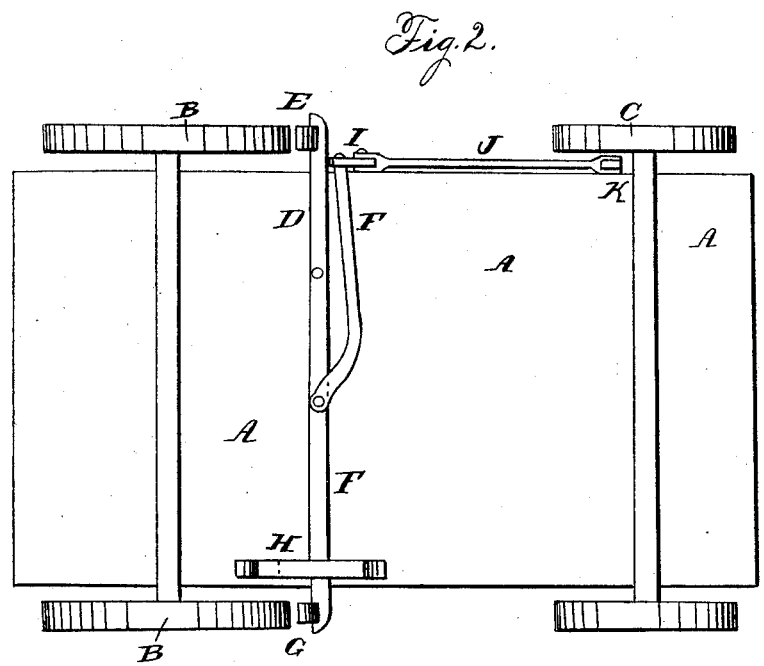
Witnesses
Inventor

UNITED STATES PATENT OFFICE.

GEORGE W. CROWE, OF CINCINNATI, OHIO, ASSIGNOR TO HIMSELF AND BENJN. MARTIN, OF THE SAME PLACE.

IMPROVEMENT IN WAGON-BRAKES.

Specification forming part of Letters Patent No. 57,625, dated August 28, 1866.

*To all whom it may concern:*

Be it known that I, GEORGE W. CROWE, of Cincinnati, Hamilton county, and State of Ohio, have invented a new and useful Improvement in Wagon-Brakes; and I do hereby declare that the following is a full, clear, and exact description thereof, which will enable others skilled in the art to make and use the same, reference being had to the accompanying drawings, forming part of this specification, in which—

Figure 1 is a side view of a wagon with my improved brake attached. Fig. 2 is an underside view of the same.

Similar letters of reference indicate like parts.

My invention has for its object to furnish an improved brake, by means of which the power applied to the operating-lever may act with double force upon the brake; and it consists in an improved wagon-brake formed by combining the lever brake-bars, the connecting-lever, the connecting-bar, and the operating-lever with each other, as hereinafter more fully described.

A is the wagon-body. B are the rear wheels, and C the front ones, about the construction of which parts there is nothing new.

D is one of the lower brake-bars, which is pivoted near its center to the bottom of the wagon-body A, as shown in Fig. 1. To one end of the lever-bar D is attached the rubber E in the ordinary manner. The other end of the brake-bar D is pivoted to and forms the fulcrum of the other lever brake-bar, F.

To one end of the lever-bar F is attached the rubber G in the ordinary manner. This end of the lever-bar F is supported by the keeper H in such a way that the end of the said bar is free to move either backward or forward. The other part of the bar F is curved to allow space for the lever-bar D, and its end is pivoted to and supported by the connecting-lever I. The lever I is a lever with equal arms pivoted to the side of the wagon-body A, as shown in Fig. 1, and is designed simply to connect the lever-bar F to the connecting-rod J, to each of which it is pivoted, as shown in Fig. 1. One end of the connecting rod or bar J is pivoted to the lever I, as before described, and its other end to the operating-lever K.

The lever K is pivoted to the side of the wagon-body, and it extends upward in such a position as to be easily reached and operated by the driver from his seat.

By this construction and arrangement of the brake, whatever power is applied to the lever K is transmitted to each of the rubbers E and G, so that the brake acts with double power. This result arises from the end of the lever D being made the fulcrum of the lever F, so that whatever power is applied to the lever F acts upon the rubber G, and with equal force through the lever D upon the rubber E.

I claim as new and desire to secure by Letters Patent—

An improved wagon-brake, formed by combining the lever brake-bars D and F, the connecting-lever I, the connecting rod or bar J, and the operating-lever K with each other, the said parts being constructed and arranged substantially as herein described, and for the purpose set forth.

GEORGE W. CROWE.

Witnesses:
JOHN MITCHELL,
DENIS MINOGUE.